(12) United States Patent
Stanjek et al.

(10) Patent No.: US 10,745,560 B2
(45) Date of Patent: Aug. 18, 2020

(54) CROSSLINKABLE MATERIALS BASED ON ORGANYL OXYSILANE-TERMINATED POLYMERS

(71) Applicant: Wacker Chemie AG, Munich (DE)

(72) Inventors: Volker Stanjek, Ampfing (DE); Lars Zander, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 92 days.

(21) Appl. No.: 16/076,862

(22) PCT Filed: Jan. 31, 2017

(86) PCT No.: PCT/EP2017/052059
§ 371 (c)(1),
(2) Date: Aug. 9, 2018

(87) PCT Pub. No.: WO2017/137281
PCT Pub. Date: Aug. 17, 2017

(65) Prior Publication Data
US 2019/0048190 A1    Feb. 14, 2019

(30) Foreign Application Priority Data
Feb. 12, 2016 (DE) .......................... 10 2016 202 196

(51) Int. Cl.
| | |
|---|---|
| *C08L 83/04* | (2006.01) |
| *C08K 3/04* | (2006.01) |
| *C09J 171/02* | (2006.01) |
| *C08L 71/02* | (2006.01) |
| *C08G 65/336* | (2006.01) |
| *C08K 3/26* | (2006.01) |
| *C09J 183/04* | (2006.01) |
| *C08G 77/00* | (2006.01) |

(52) U.S. Cl.
CPC ............ *C08L 83/04* (2013.01); *C08G 65/336* (2013.01); *C08K 3/04* (2013.01); *C08K 3/26* (2013.01); *C08L 71/02* (2013.01); *C09J 171/02* (2013.01); *C09J 183/04* (2013.01); *C08G 77/80* (2013.01); *C08K 2003/265* (2013.01); *C08K 2003/267* (2013.01); *C08K 2201/006* (2013.01); *C08L 2312/08* (2013.01)

(58) Field of Classification Search
None
See application file for complete search history.

(56) References Cited

U.S. PATENT DOCUMENTS

| | | | | |
|---|---|---|---|---|
| 3,075,844 A | * | 1/1963 | Hall, Jr. .................. | C09D 11/03 106/31.88 |
| 4,222,925 A | * | 9/1980 | Bryant .................... | C09J 175/04 524/589 |
| 5,981,625 A | * | 11/1999 | Zou ......................... | C09D 11/02 260/DIG. 38 |
| 5,990,257 A | * | 11/1999 | Johnston ................. | C08G 18/10 528/28 |
| 6,884,852 B1 | | 4/2005 | Klauck et al. | |
| 2004/0127622 A1 | | 7/2004 | Pfenninger et al. | |
| 2005/0119436 A1 | | 6/2005 | Ziche et al. | |
| 2007/0167598 A1 | | 7/2007 | Stanjek et al. | |
| 2010/0010163 A1 | | 1/2010 | Berthold et al. | |
| 2014/0155545 A1 | | 6/2014 | Stanjek et al. | |
| 2015/0031806 A1 | | 1/2015 | Lim et al. | |
| 2017/0210957 A1 | * | 7/2017 | Stanjek ................ | C08G 65/336 |

FOREIGN PATENT DOCUMENTS

| | | |
|---|---|---|
| DE | 102011081264 A1 | 2/2013 |
| EP | 1093482 B1 | 8/2004 |
| EP | 1641854 B1 | 1/2007 |
| EP | 1535940 B1 | 6/2007 |
| EP | 1397406 B1 | 3/2010 |
| EP | 1896532 B1 | 3/2010 |
| WO | WO-2015158623 A1 * 10/2015 .............. C09J 11/04 |

OTHER PUBLICATIONS

Datasheet for Elftex 8 specialty black, 2 pages, 2016. (Year: 2016).*
Excerpt from the Handbook of Fillers, Extenders and Diluents, second edition, compiled by Michael and Irene Ash, 1 page, 2007. (Year: 2007).*

* cited by examiner

Primary Examiner — Robert S Loewe
(74) Attorney, Agent, or Firm — Brooks Kushman P.C.

(57) ABSTRACT

Moisture curing alkoxysilyl-functional polymer compositions containing a high phenyl-content silicone resin and carbon black exhibit high adhesion to substrates, high tensile strength, very high elongation, and high tear strength without becoming unduly hard.

19 Claims, No Drawings

CROSSLINKABLE MATERIALS BASED ON ORGANYL OXYSILANE-TERMINATED POLYMERS

CROSS REFERENCE TO RELATED APPLICATIONS

This application is the U.S. National Phase of PCT Appln. No. PCT/EP2017/052059 filed Jan. 31, 2017, which claims priority to German Application No. 10 2016 202 196.6 filed Feb. 12, 2016, the disclosures of which are incorporated in their entirety by reference herein.

BACKGROUND OF THE INVENTION

1. Field of the Invention

The invention relates preferably to one-component, crosslinkable compositions of silane-crosslinking prepolymers, to methods for producing them, and to the use thereof as adhesives and sealants, especially for the bonding of substrates.

2. Description of the Related Art

Polymer systems which possess reactive alkoxysilyl groups have a long history. On contact with water or atmospheric moisture, these alkoxysilane-terminated polymers are capable even at room temperature of undergoing condensation with one another, accompanied by elimination of the alkoxy groups. One of the most important applications of such materials is the production of adhesives.

Adhesives based on alkoxysilane-crosslinking polymers, then, exhibit not only good adhesion properties on certain substrates, when in the fully cured state, but also very good mechanical properties, since they may have a high elasticity as well as a tensile strength sufficient for numerous applications. A further advantage of silane-crosslinking systems relative to numerous other adhesive and sealant technologies (relative to isocyanate-crosslinking systems, for example) is the toxicological unobjectionability of the prepolymers.

There are numerous applications where one-component (1K) systems are preferred which cure on contact with atmospheric moisture. The decisive advantages of one-component systems are, above all, their very great ease of application, since in this case there is no need for the user to mix a variety of adhesive components. In addition to the time/labor savings and the reliable avoidance of any dosing errors, there is also no need, with one-component systems, to process the adhesive/sealant within a usually very narrow time window, as is the case with multicomponent systems after the two components have been mixed together.

One particular variant of adhesives based on alkoxysilane-crosslinking polymers is described in DE-A 10 2011 081264, comprising phenylsilicone resins as well as the silane-crosslinking polymers. The corresponding resin additives also lead to adhesives which, following their complete curing, exhibit considerably enhanced hardness and lap shear strength.

A disadvantage of these systems, however, is the comparatively low elasticity of the corresponding resin-containing adhesive systems after they have cured. Hence the elongations at break of such systems are well below 200%, indeed often below 50%. As positive as the resin addition is for the hardness and lap shear strength, its effect on the elasticity is negative.

This is admittedly not of relevance for all applications, but for elastic bonds in particular, the desire is for adhesives with high elasticity. This is the case, for instance, when materials having different thermal expansions are to be surface-bonded to one another, or else for many adhesive applications in automobile production, as for example in bodywork construction, in the bonding of fittings, of headlamps or of windshields. The requirement here, in general, is for a combination of high tensile strength with high elasticity.

Adhesive formulations based on certain silane-terminated polymers, referred to as silane-terminated polyurethanes, which at least to a certain degree have such a combination of properties, are described in EP-A 1 397 406. In this case particular silane-terminated polymers, referred to as silane-terminated polyurethanes, are formulated together with calcium carbonate and carbon black. For many applications, however, the profiles of properties that are attainable by this route, with elongations at break of 250-300% and tensile strengths of 4.5-5.5 MPa, are still inadequate.

SUMMARY OF THE INVENTION

A subject of the invention are crosslinkable compositions comprising
(A) 100 parts of compounds of the formula

$$Y-[(CR^1_2)_b-SiR_a(OR^2)_{3-a}]_x \quad (I),$$

where
Y denotes an x-valent polymer radical bonded via nitrogen, oxygen, sulfur or carbon,
R may be identical or different and represents a monovalent, optionally substituted hydrocarbyl radical,
$R^1$ may be identical or different and represents hydrogen atom or a monovalent, optionally substituted hydrocarbyl radical which may be attached to the carbon atom via nitrogen, phosphorus, oxygen, sulfur or carbonyl group,
$R^2$ may be identical or different and represents hydrogen atom or a monovalent, optionally substituted hydrocarbyl radical, x is an integer from 1 to 10, preferably 1, 2 or 3, more preferably 1 or 2,
a may be identical or different and is 0, 1 or 2, preferably 0 or 1, and
b may be identical or different and is an integer from 1 to 10, preferably 1, 3 or 4, more preferably 1 or 3, most preferably 1,
(B) at least 5 parts by weight of silicone resin(s) comprising units of the formula

$$R^3_c(R^4O)_d R^5_e SiO_{(4-c-d-e)/2} \quad (II),$$

where
$R^3$ may be identical or different and denote hydrogen, a monovalent, SiC-bonded, optionally substituted aliphatic hydrocarbyl radical or a divalent, optionally substituted, aliphatic hydrocarbyl radical which bridges two units of the formula (II),
$R^4$ may be identical or different and represents hydrogen or a monovalent, optionally substituted hydrocarbyl radical,
$R^5$ may be identical or different and represents a monovalent, SiC-bonded, optionally substituted aromatic hydrocarbyl radical,
c is 0, 1, 2 or 3,
d is 0, 1, 2 or 3, preferably 0, 1 or 2, more preferably 0 or 1, and
e is 0, 1 or 2, preferably 0 or 1, with the proviso that the sum of c+d+e is less than or equal to 3 and in at least 40% of the units of the formula (II) the sum c+e is 0 or 1, and (C) at least 10 parts by weight of carbon black.

DETAILED DESCRIPTION OF THE PREFERRED EMBODIMENTS

The invention is based on the discovery that by virtue of this innovative combination of features it is possible to attain a hitherto unattained amalgamation of a high tensile strength with a further significantly improved elasticity.

Especially surprising here was that the inventive addition of silicone resins (B), relative to the carbon black-containing systems described in EP 1 397 406, leads to a significant improvement in the elasticity. This is all the more surprising since the addition of silicone resins to other silane-crosslinking polymer systems, of the kind disclosed in DE-A 10 2011 081264, for example, results certainly in an increase in the hardness but at the same time, however, also to a massive reduction in the elasticity.

Similarly surprising was the discovery that the compositions of the invention have a very unusually high tear resistance of preferably more than 20 N/mm, and even in some cases more than 30 N/mm.

Examples of radicals R are alkyl radicals such as the methyl, ethyl, n-propyl, isopropyl-, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical, isooctyl radicals, and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl-, anthryl and phenanthryl radicals; alkaryl radicals such as the o-, m-, p-tolyl, xylyl and ethylphenyl radicals; and aralkyl radicals such as the benzyl radical, and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical, and the heptafluoroisopropyl radical, and haloaryl radicals, such as the o-, m- and p-chlorophenyl radicals.

Radical R preferably comprises optionally halogen-atom-substituted, monovalent hydrocarbyl radicals having 1 to 6 carbon atoms, and most preferably alkyl radicals having 1 or 2 carbon atoms, more particularly the methyl radical.

Examples of radicals $R^1$ are hydrogen, the radicals specified for R, and also optionally substituted hydrocarbyl radicals bonded to carbon atom via nitrogen, phosphorus, oxygen, sulfur, carbon or by a carbonyl group.

Radical $R^1$ preferably comprises hydrogen or hydrocarbyl radicals having 1 to 20 carbon atoms, more preferably hydrogen.

Examples of radical $R^2$ are hydrogen and the examples specified for radical R.

Radical $R^2$ preferably comprises hydrogen or optionally halogen-atom-substituted alkyl radicals having 1 to 10 carbon atoms, more preferably alkyl radicals having 1 to 4 carbon atoms, and most preferably methyl or ethyl radicals.

Polymers on which the polymer radical Y is based are, for the purposes of the present invention, all polymers wherein at least 50%, preferably at least 70%, more preferably at least 90% of all bonds in the main chain are carbon-carbon, carbon-nitrogen or carbon-oxygen bonds.

Examples of polymer radicals Y are polyester, polyether, polyurethane, polyalkylene, and polyacrylate radicals.

Polymer radical Y preferably comprises organic polymer radicals which comprise as their polymer chain polyoxyalkylenes, such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers, such as polyisobutylene and copolymers of polyisobutylene with isoprene; polychloroprenes; polyisoprenes; polyurethanes; polyesters; polyamides; polyacrylates; polymethacrylates; vinylpolymer, or polycarbonates, and which are bonded to the group or groups —[$(CR^1_2)_b$-$SiR_a(OR^2)_{3-a}$] preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, —NR'—, where R' may be identical or different and has a definition specified for R or is a group —CH(COOR'')—CH₂—COOR'', in which R'' may be identical or different and has a definition specified for R.

Radical R' preferably comprises a group —CH(COOR'')—CH₂—COOR'' or an optionally substituted hydrocarbyl radical having 1 to 20 carbon atoms, more preferably a linear, branched or cyclic alkyl group having 1 to 20 carbon atoms, or an optionally halogen-atom-substituted aryl group having 6 to 20 carbon atoms.

Examples of radicals R' are cyclohexyl, cyclopentyl, n-propyl and isopropyl, n-butyl, isobutyl, and t-butyl radical, the various stereoisomers of the pentyl radical, hexyl radical or heptyl radical, and also the phenyl radical.

The radicals R'' preferably comprise alkyl groups having 1 to 10 carbon atoms, more preferably methyl, ethyl or propyl radicals.

Component (A) may have the groups —[$(CR^1_2)_b$-$SiR_a(OR^2)_{3-a}$], attached in the manner described, at any desired locations in the polymer chain, such as internally and/or terminally, for instance.

Radical Y in formula (I) more preferably comprises x-valent organic polymer radicals which are bonded via nitrogen, oxygen, sulfur or carbon and which as their polymer chain comprise polyurethanes or polyoxyalkylenes, and more particularly comprises polyurethane radicals having terminally attached groups —[$(CR^1_2)_b$-$SiR_a(OR^2)_{3-a}$] or polyoxyalkylene radicals having terminally attached groups —[$(CR^1_2)_b$-$SiR_a(OR^2)_{3-a}$], where the radicals and indices have the definitions stated above. The radicals Y are preferably linear or have 1 to 3 branching points. More preferably they are linear.

The polyurethane radicals Y are preferably radicals whose chain ends are bonded to the group or groups —[$(CR^1_2)_b$-$SiR_a(OR^2)_{3-a}$] via —NH—C(=O)O—, —NH—C(=O)—NH—, —NR'—C(=O)—NH— or —NH—C(=O)—NR'—, more particularly via —O—C(=O)—NH— or —NH—C(=O)—NR'—, with all of the radicals and indices having one of the definitions stated above. These polyurethane radicals Y are preferably preparable from linear or branched polyoxyalkylenes, more particularly from polypropylene glycols, and from di- or polyisocyanates. The radicals Y here preferably have average molar masses $M_n$ (numerical averages) of 400 to 30,000 g/mol, preferably of 4000 to 20,000 g/mol. Suitable methods for preparing such a component (A) and also examples of component (A) itself are described in publications including EP 1 093 482 B1 (paragraphs [0014]-[0023], [0039]-[0055] and also inventive example 1 and comparative example 1) or EP 1 641 854 B1 (paragraphs [0014]-[0035], inventive examples 4 and 6 and also comparative examples 1 and 2), which are considered part of the disclosure content of the present specification (incorporated herein by reference).

The number-average molar mass $M_n$ is determined for the purposes of the present invention by means of size exclusion chromatography (SEC) against polystyrene standard, in THF, at 60° C., flow rate 1.2 ml/min, with detection by RI (refractive index detector), on a Styragel HR3-HR4-HR5-HR5 column set from Waters Corp. USA, with an injection volume of 100 µl.

The polyoxyalkylene radicals Y preferably comprise linear or branched polyoxyalkylene radicals, more preferably polyoxypropylene radicals, whose chain ends are bonded to the group or groups —[(CR$^1_2$)$_b$-SiR$_a$(OR$^2$)$_{3-a}$] preferably via —O—C(=O)—NH— or ——, with the radicals and indices having one of the definitions stated above. Preferably here at least 85%, more preferably at least 90%, more particularly at least 95% of all chain ends are bonded to the group —[(CR$^1_2$)$_b$-SiR$_a$(OR$^2$)$_{3-a}$] via —O—C(=O)—NH—. The polyoxyalkylene radicals Y preferably have average molar masses $M_n$ of 4000 to 30,000 g/mol, more preferably of 8000 to 20,000 g/mol. Suitable methods for preparing such a component (A) and also examples of component (A) itself are described in publications including EP 1 535 940 B1 (paragraphs [0005]-[0025] and also inventive examples 1-3 and comparative examples 1-4) or EP 1 896 523 B1 (paragraphs [0008]-[0047]), which are considered part of the disclosure content of the present specification (incorporated by reference herein).

The end groups of the compounds (A) used in accordance with the invention preferably comprise groups of the general formulae

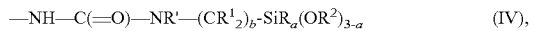  (IV),

  (V)

or

  (VI), where the radicals and indices have one of the definitions specified for them above.

Where the compounds (A) are polyurethanes, as is preferred, they preferably have one or more of the end groups
—NH—C(=O)—NR'—(CH$_2$)$_3$-Si(OCH$_3$)$_3$,
—NH—C(=O)—NR'—(CH$_2$)$_3$-Si(OC$_2$H$_5$)$_3$,
—O—C(=O)—NH—(CH$_2$)$_3$-Si(OCH$_3$)$_3$ or
—O—C(=O)—NH—(CH$_2$)$_3$-Si(OC$_2$H$_5$)$_3$,
where R' has the definition stated above.

Where the compounds (A) are polypropylene glycols, as is particularly preferred, they preferably have one or more of the end groups
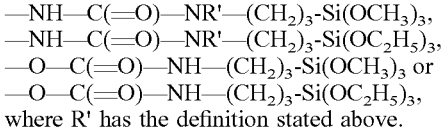
with the two last-mentioned end groups being particularly preferred.

The average molecular weights $M_n$ of the compounds (A) are preferably at least 400 g/mol, more preferably at least 4000 g/mol, more particularly at least 10,000 g/mol, and preferably at most 30,000 g/mol, more preferably at most 20,000 g/mol, more particularly at most 19,000 g/mol.

The viscosity of the compounds (A) is preferably at least 0.2 Pas, more preferably at least 1 Pas, most preferably at least 5 Pas, and preferably at most 700 Pas, more preferably at most 100 Pas, measured in each case at 20° C.

The viscosity for the purposes of the present invention is determined after conditioning to 23° C. with a DV 3 P rotational viscometer from A. Paar (Brookfield system) using spindel 5, at 2.5 rpm, in accordance with ISO 2555.

The compounds (A) used in accordance with the invention are commercial products or can be prepared by methods common in chemistry.

The polymers (A) may be prepared by known methods, such as addition reactions, as for example of hydrosilylation, Michael addition, Diels-Alder addition or reactions between isocyanate-functional compounds with compounds which have isocyanate-reactive groups.

The component (A) used in accordance with the invention may comprise only one kind of compound of the formula (I) or else mixtures of different kinds of compounds of the formula (I). In that case the component (A) may comprise exclusively compounds of the formula (I) in which more than 90%, preferably more than 95%, and more preferably more than 98% of all silyl groups bonded to the radical Y are identical. In that case, however, it is also possible to use a component (A) which at least in part comprises compounds of the formula (I) in which different silyl groups are bonded to a radical Y. Lastly, component (A) used may also comprise mixtures of different compounds of the formula (I) in which in total at least 2 different kinds of silyl groups bonded to radicals Y are present, but with all silyl groups bonded to a particular radical Y being identical.

The compositions of the invention preferably comprise compounds (A) in concentrations of at most 60 wt %, more preferably at most 40 wt %, and preferably at least 10 wt %, more preferably at least 15 wt %.

Based on 100 parts by weight of component (A), the compositions of the invention preferably comprise at least 10 parts by weight, more preferably at least 15 parts by weight, of component (B). Based on 100 parts by weight of component (A), the compositions of the invention comprise preferably at most 300 parts by weight, more preferably at most 200 parts by weight, and most preferably at most 100 parts by weight of component (B).

Component (B) consists preferably to an extent of at least 90 wt % of units of the formula (II). With particular preference component (B) consists exclusively of units of the formula (II).

Examples of radicals $R^3$ are the aliphatic examples specified above for R. Radical $R^3$, however, may also comprise divalent aliphatic radicals which join two silyl groups of the formula (II) to one another, such as, for example, alkylene radicals having 1 to 10 carbon atoms, such as methylene, ethylene, propylene or butylene radicals, for instance. One particularly common example of a divalent aliphatic radical is the ethylene radical.

Preferably, however, radical $R^3$ comprises optionally halogen-atom-substituted, monovalent, SiC-bonded aliphatic hydrocarbyl radicals having 1 to 18 carbon atoms, more preferably aliphatic hydrocarbyl radicals having 1 to 6 carbon atoms, more particularly the methyl radical.

Examples of radical $R^4$ are hydrogen and the examples specified for radical R.

Radical $R^4$ preferably comprises hydrogen atom or optionally halogen-atom-substituted alkyl radicals having 1 to 10 carbon atoms, more preferably alkyl radicals having 1 to 4 carbon atoms, more particularly the methyl or ethyl radical.

Examples of radicals $R^5$ are the aromatic radicals specified above for R.

Radical $R^5$ preferably comprises optionally halogen-atom-substituted, SiC-bonded, aromatic hydrocarbyl radicals having 1 to 18 carbon atoms, such as, for example, ethylphenyl, tolyl, xylyl, chlorophenyl, naphthyl or styryl radicals, more preferably the phenyl radical.

Preferred for use as component (B) are silicone resins in which at least 90% of all radicals $R^3$ are methyl radicals.

Preferred for use as component (B) are silicone resins in which at least 90% of all radicals $R^4$ are methyl, ethyl, propyl or isopropyl radicals.

Preferred for use as component (B) are silicone resins in which at least 90% of all radicals $R^5$ are phenyl radicals.

Preference is given in accordance with the invention to using silicone resins (B) which have at least 20%, more preferably at least 40%, of units of the formula (II) in which c is 0, based in each case on the total number of units of the formula (II).

Preference is given to using silicone resins (B) which, based in each case on the total number of units of the formula (II), have at least 70%, more preferably at least 80%, of units of the formula (II) in which d has a value of 0 or 1.

Preferred for use as component (B) are silicone resins (B1) which, based in each case on the total number of units of the formula (II), have at least 20%, more preferably at least 40%, most preferably at least 50%, of units of the formula (II) in which e has a value of 1.

In one particular embodiment of the invention, silicone resins (B1) are used in which $R^5$ is a phenyl radical and which, based in each case on the total number of units of the formula (II), have at least 70%, more preferably at least 80%, of units of the formula (II) in which e has a value of 1, or which exclusively have units of the formula (II) in which e is 1.

The basis for this particular embodiment is the surprising discovery that the use of silicone resins having such a high fraction of silicon-bonded phenyl groups leads to adhesives having particularly high elasticities.

In one particularly preferred implementation of the invention, component (B) used comprises silicone resins (B1) which, based in each case on the total number of units of the formula (II), have at least 30%, more preferably at least 60%, more preferably at least 90%, of units of the formula (II) in which e has a value of 1 and c has a value of 0.

Examples of the silicone resins (B) used in accordance with the invention are organopolysiloxane resins which consist substantially, preferably exclusively, of units selected from (Q) units of the formulae $SiO_{4/2}$, $Si(OR^4)O_{3/2}$, $Si(OR^4)_2O_{2/2}$, and $Si(OR^4)_3O_{1/2}$, (T) units of the formulae $PhSiO_{3/2}$, $PhSi(OR^4)O_{2/2}$, and $PhSi(OR^4)_2O_{1/2}$, (D) units of the formulae $Me_2SiO_{2/2}$ and $Me_2Si(OR^4)O_{1/2}$, and (M) units of the formula $Me_3SiO_{1/2}$, where Me stands for methyl, Ph stands for phenyl, and $R^4$ stands for hydrogen or optionally halogen substituted alkyl radicals having 1 to 10 carbon atoms, more preferably for unsubstituted alkyl radicals having 1 to 4 carbon atoms, where the resin (B) preferably comprises (T) units and per mole of (T) units has preferably 0-2 mol of (Q) units, 0-2 mol of (D) units, and 0-2 mol of (M) units.

Preferred examples of the silicone resins (B) used in accordance with the invention are organopolysiloxane resins which consist substantially, preferably exclusively, of units selected from (T) units of the formulae $PhSiO_{3/2}$, $PhSi(OR^4)O_{2/2}$, and $PhSi(OR^4)_2O_{1/2}$ and also (T) units of the formulae $MeSiO_{3/2}$, $MeSi(OR^4)O_{2/2}$, and $MeSi(OR^4)_2O_{1/2}$, where Me stands for methyl, Ph stands for phenyl, and $R^4$ stands for hydrogen or optionally halogen substituted alkyl radicals having 1 to 10 carbon atoms.

Further preferred examples of the silicone resins (B) used in accordance with the invention are organopolysiloxane resins which consist substantially, preferably exclusively, of units selected from (T) units of the formulae $PhSiO_{3/2}$, $PhSi(OR^4)O_{2/2}$, and $PhSi(OR^4)_2O_{1/2}$, (I) units of the formulae $MeSiO_{3/2}$, $MeSi(OR^4)O_{2/2}$, and $MeSi(OR^4)_2O_{1/2}$ and also (D) units of the formulae $Me_2SiO_{2/2}$ and $Me_2Si(OR^4)O_{1/2}$, where Me stands for methyl, Ph stands for phenyl, and $R^4$ stands for hydrogen or optionally halogen substituted alkyl radicals having 1 to 10 carbon atoms, preferably for unsubstituted alkyl radicals having 1 to 4 carbon atoms, with a molar ratio of phenylsilicone units to methylsilicone units of 0.5 to 4.0. The amount of D units in these silicone resins is preferably below 10 wt %.

Particularly preferred examples of the silicone resins (B1) used in accordance with the invention are organopolysiloxane resins which consist to an extent of 80%, preferably 90%, more particularly exclusively, of (T) units of the formulae $PhSiO_{3/2}$, $PhSi(OR^4)O_{2/2}$, and $PhSi(OR^4)_2O_{1/2}$, where Ph stands for phenyl and $R^4$ stands for hydrogen or optionally halogen- substituted alkyl radicals having 1 to 10 carbon atoms, preferably for unsubstituted alkyl radicals having 1 to 4 carbon atoms, based in each case on the total number of units. As already described, the use of silicone resins having such a high fraction of silicon-bonded phenyl groups leads to adhesives having particularly high elasticities.

The silicone resins (B) used in accordance with the invention preferably possess an average molar mass (numerical average) $M_n$ of at least 400 g/mol and more preferably of at least 600 g/mol. The average molar mass $M_n$ is preferably at most 400,000 g/mol, more preferably at most 10,000 g/mol, and most preferably at most 3000 g/mol.

The silicone resins (B) used in accordance with the invention may be either solid or liquid at 23° C. and 1000 hPa, with silicone resins (B) preferably being liquid. The silicone resins (B) preferably possess a viscosity of 10 to 100,000 mPas, more preferably of 50 to 50,000 mPas, and most preferably of 100 to 20,000 mPas.

The silicone resins (B) used in accordance with the invention preferably possess a polydispersity ($M_w/M_n$) of not more than 5, preferably not more than 3.

The mass-average molar mass $M_w$, like the number-average molar masses $M_n$, is determined by size exclusion chromatography (SEC) against polystyrene standard, in THF, at 60° C., flow rate 1.2 ml/min, with detection by RI (refractive index detector), on a Styragel HR3-HR4-HR5-HR5 column set from Waters Corp. USA, with an injection volume of 100 µl.

The silicone resins (B) can be used either in pure form or else in the form of a mixture with a suitable solvent (BL).

As solvents (BL) here it is possible to use all compounds which are not reactive toward components (A) and (B) at room temperature and have a boiling point <250° C. at 1013 mbar.

Examples of solvents (BL) are ethers (e.g., diethyl ether, methyl tert-butyl ether, ether derivatives of glycol, THF), esters (e.g., ethyl acetate, butyl acetate, glycol esters), aliphatic hydrocarbons (e.g., pentane, cyclopentane, hexane, cyclohexane, heptane, octane, or else longer-chain branched and unbranched alkanes), ketones (e.g., acetone, methyl ethyl ketone), aromatics (e.g., toluene, xylene, ethylbenzene, chlorobenzene) or else alcohols (e.g., methanol, ethanol, glycol, propanol, isopropanol, glycerol, butanol, isobutanol, and tert-butanol).

Many resins (B1) available commercially, as for example the resins SILRES® SY 231, SILRES® IC 231, SILRES® IC 368 or SILRES® IC 678 from Wacker Chemie AG (Munich, DE), though liquid at 23° C. and 1013 hPa, nevertheless include, as a result of the production process, small amounts of solvents (BL), especially toluene. Hence the resins identified above contain about 0.1 wt % of toluene, based on the total weight of the resin.

In one preferred implementation of the invention, component (B) comprises resins (B1) which contain less than 0.1 wt %, preferably less than 0.05 wt %, more preferably less than 0.02 wt %, most preferably less than 0.01 wt %, of aromatic solvents (BL). Examples of products available commercially include GENIOSIL IC® 368 or GENIOSIL® IC 678 from Wacker Chemie AG (Munich, Del.).

In one particularly preferred embodiment of the invention, component (B) comprises resins (B1) which with the exception of alcohols $R^4OH$ contain less than 0.1 wt %, preferably less than 0.05 wt %, more preferably less than 0.02 wt %, and most preferably less than 0.01 wt %, of solvents (BL), with $R^4$ having the definition stated above.

In one especially preferred implementation of the invention, component (B) used comprises resins (B1) which with the exception of alcohols $R^4OH$ contain no solvents (BL) at all, with $R^4$ having the definition stated above.

The silicone resins (B) and/or (B1) used in accordance with the invention are commercial products or can be produced by methods common in silicon chemistry.

The compounds (A) described as preferred or more preferred are preferably used in combination with resins (B1) and carbon black (C) in the preferred proportions.

The carbon black (C) used in accordance with the invention may comprise any of a very wide variety of types of carbon black.

Examples of carbon blacks (C) are carbon blacks in all available and known modifications, such as combustion blacks, furnace blacks, lamp blacks, gas blacks, and channel blacks, and cracking or thermal blacks, such as acetylene blacks and arc blacks, and also carbon blacks known in the art as specialty blacks, and acetylene black, such as, for instance, the carbon blacks available from SKW, Germany under the name Acetogen UV, or Ensacko 250 carbon black from Emerys, France, lamp black, such as, for instance, Durex blacks, and also Printex® blacks from Evonik, Germany, such as, for instance, Printex® 55, Printex® 60, Printex® 30, Printex® 80, and Printex® 90, and carbon blacks with the trade name Experimental Black XPB 412, Nerox® 505 or Panther® 205 from Orion (Frankfurt am Main, DE).

Carbon black (C) used in accordance with the invention has a BET surface area of preferably more than 30 m²/g, more preferably of more than 50 m²/g, and most preferably of at least 70 m²/g, the BET surface area being determined in accordance with DIN 66131 (with nitrogen). The carbon black (C) used in accordance with the invention preferably has a BET surface area of at most 600 m²/g, more preferably of at most 400 m²/g.

The average particle size of carbon black (C) used in accordance with the invention, measured according to ASTM D 3849, is preferably between 10 and 70 nm, more preferably between 15 and 50 nm.

The oil number (oil absorption number (OAN)) of carbon black (C) used in accordance with the invention, measured according to ASTM D 2414 is preferably between 40 and 180 ml/100 g, more preferably between 40 and 140 ml/100 g.

Since the carbon black (C) is being used in a moisture-curing composition, it ought to be sufficiently dry, or else ought to be dried ahead of its use. Carbon black (C) used in accordance with the invention preferably has a moisture content of at most 1.0 wt %, more preferably of at most 0.5 wt %, and most preferably of at most 0.3 wt %.

The carbon black (C) used in accordance with the invention preferably comprises furnace blacks, more preferably furnace blacks having a BET surface area of 30 to 600 m²/g and an oil number of between 40 and 180 ml/100 g.

Based on 100 parts by weight of the component (A), the compositions of the invention preferably comprise at least 20 parts by weight, more preferably at least 30 parts by weight, of component (C). Based on 100 parts by weight of the component (A), the compositions of the invention preferably comprise at most 200 parts by weight, more preferably at most 150 parts by weight, most preferably at most 100 parts by weight, of component (C).

The compositions of the invention, based on their total mass, preferably comprise at least 5 wt %, more preferably at least 10 wt %, and most preferably at least 15 wt %, of component (C). The compositions of the invention, based on their total mass, preferably comprise at most 30 wt %, more preferably at most 25 wt %, most preferably at most 20 wt %, of component (C).

In addition to the components (A), (B) and (C) that are employed, the compositions of the invention may comprise all further substances which have also been used to date in crosslinkable compositions and which are different from components (A), (B) and (C), such as, for example, nitrogen-containing organosilicon compounds (D), fillers (E), nonreactive plasticizers (F), catalysts (G), adhesion promoters (H), water scavengers (I), additives (J), and adjuvants (K).

Component (D), employed optionally, preferably comprises organosilicon compounds comprising units of the formula

$$D_f Si(OR^7)_g R^6{}_h O_{(4-f-g-h)/2} \qquad (III),$$

in which
R⁶ may be identical or different and denotes a monovalent, optionally substituted, SiC-bonded, nitrogen-free organic radical,
R⁷ may be identical or different and denotes hydrogen or optionally substituted hydrocarbyl radicals,
D may be identical or different and denotes a monovalent, SiC-bonded radical having at least one nitrogen atom not bonded to a carbonyl group (C═O),
f is 0, 1, 2 or 3, preferably 1,
g is 0, 1, 2 or 3, preferably 1, 2 or 3, more preferably 1 or 3, and
h is 0, 1, 2, 3 or 4, preferably 1,
with the proviso that the sum of f+g+h is less than or equal to 4 and there is at least one radical D present per molecule.

The organosilicon compounds (D) used optionally in accordance with the invention may be silanes, i.e., compounds of the formula (III) with f+g+h=4, and siloxanes, i.e., compounds comprising units of the formula (III) with f+g+h≤3, and are preferably silanes.

Examples of radical R⁶ are the examples specified for R.
Radical R⁶ preferably comprises optionally halogen-substituted hydrocarbyl radicals having 1 to 18 carbon atoms, more preferably hydrocarbyl radicals having 1 to 5 carbon atoms, more particularly the methyl radical.

Examples of optionally substituted hydrocarbyl radicals $R^7$ are the examples specified for radical R.

The radicals $R^7$ preferably comprise hydrogen or optionally halogen-substituted hydrocarbyl radicals having 1 to 18 carbon atoms, more preferably hydrogen or hydrocarbyl radicals having 1 to 10 carbon atoms, more particularly methyl or ethyl radicals.

Examples of radicals D are radicals of the formulae $H_2N(CH_2)_3$-, $H_2N(CH_2)_2NH(CH_2)_3$-, $H_2N(CH_2)_2NH(CH_2)_2NH(CH_2)_3$-, $H_3CNH(CH_2)_3$-, $C_2H_5NH(CH_2)_3$-, $C_3H_7NH(CH_2)_3$-, $C_4H_9NH(CH_2)_3$-, $C_5H_{11}NH(CH_2)_3$-, $C_6H_{13}NH(CH_2)_3$-, $C_7H_{15}NH(CH_2)_3$-, $H_2N(CH_2)_4$-, $H_2N$—$CH_2$—$CH(CH_3)$—$CH_2$-, $H_2N(CH_2)_5$-, cyclo-$C_5H_9NH(CH_2)_3$-, cyclo-$C_6H_{11}NH(CH_2)_3$-, phenyl- $NH(CH_2)_3$-, $(CH_3)_2N(CH_2)_3$-, $(C_2H_5)_2N(CH_2)_3$-, $(C_3H_7)_2N(CH_2)_3$-, $(C_4H_9)_2N(CH_2)_3$-, $(C_5H_{11})_2N(CH_2)_3$-, $(C_6H_{13})_2N(CH_2)_3$-, $(C_7H_5)_2N(CH_2)_3$-, $H_2N(CH_2)$-, $H_2N(CH_2)_2NH(CH_2)$-, $H_2N(CH_2)_2NH(CH_2)_2NH(CH_2)$-, $H_3CNH(CH_2)$-, $C_2H_5NH(CH_2)$-, $C_3H_7NH(CH_2)$-, $C_4H_9NH(CH_2)$-, $C_5H_{11}NH(CH_2)$-, $C_6H_{13}NH(CH_2)$-, $C_7H_{15}NH(CH_2)$-, cyclo-$C_5H_9NH(CH_2)$-, cyclo-$C_6H_{11}NH(CH_2)$-, phenyl-$NH(CH_2)$-, $(CH_3)_2N(CH_2)$-, $(C_2H_5)_2N(CH_2)$-, $(C_3H_7)_2N(CH_2)$-, $(C_4H_9)_2N(CH_2)$-, $(C_5H_{11})_2N(CH_2)$-, $(C_6H_{13})_2N(CH_2)$-, $(C_7H_{15})_2N(CH_2)$-, $(CH_3O)_3Si(CH_2)_3NH(CH_2)_3$-, $(C_2H_5O)_3Si(CH_2)_3NH(CH_2)_3$-, $(CH_3O)_2(CH_3)Si(CH_2)_3NH(CH_2)_3$-, and $(C_2H_5O)_2(CH_3)Si(CH_2)_3NH(CH_2)_3$- and also reaction products of the above primary amino groups with compounds which comprise epoxide groups or double bonds that are reactive toward primary amino groups.

Preferably radical D comprises the $H_2N(CH_2)_3$-, $H_2N(CH_2)_2NH(CH_2)_3$- or cyclo-$C_6H_{11}NH(CH_2)_3$- radical.

Examples of the silanes of the formula (III) used optionally in accordance with the invention are $H_2N(CH_2)_3$-Si$(OCH_3)_3$, $H_2N(CH_2)_3$-SiCH$_2)(OC_2H_5)_3$, $H_2N(CH_2)_3$-Si$(OCH_3)_2CH_3$, $H_2N(CH_2)_3$-Si$(OC_2H_5)_2CH_3$, $H_2N(CH_2)_2NH(CH_2)_3$-Si$(OCH_3)_3$, $H_2N(CH_2)_2NH(CH_2)_3$-Si$(OC_2H_5)_3$-, $H_2N(CH_2)_2NH(CH_2)_3$-Si$(OCH_3)_2CH_3$, $H_2N(CH_2)_2NH(CH_2)_3$-Si$(OC_2H_5)_2CH_3$, $H_2N(CH_2)_2NH(CH_2)_3$-Si$(OH)_3$, $H_2N(CH_2)_2NH(CH_2)_3$-Si$(OH)_2CH_3$, $H_2N(CH_2)_2NH(CH_2)_2NH(CH_2)_3$-Si$(OCH_3)_3$, $H_2N(CH_2)_2NH(CH_2)_2NH(CH_2)_3$-Si$(OC_2H_5)_3$, cyclo-$C_6H_{11}NH(CH_2)_3$-Si$(OCH_3)_3$, cyclo-$C_6H_{11}NH(CH_2)_3$-Si$(OC_2H_5)_3$, cyclo-$C_6H_{11}NH(CH_2)_3$-Si$(OCH_3)_2CH_3$, cyclo-$C_6H_{11}NH(CH_2)_3$-Si$(OC_2H_5)_2CH_3$, cyclo-$C_6H_{11}NH(CH_2)_3$-Si$(OH)_3$, cyclo-$C_6H_{11}NH(CH_2)_3$-Si$(OH)_2CH_3$, phenyl-$NH(CH_2)_3$-Si$(OCH_3)_3$, phenyl-$NH(CH_2)_3$-Si$(OC_2H_5)_3$, phenyl-$NH(CH_2)_3$- Si$(OCH_3)_2CH_3$, phenyl-$NH(CH_2)_3$-Si$(OC_2H_5)_2CH_3$, phenyl-$NH(CH_2)_3$-Si$(OH)_3$, phenyl-$NH(CH_2)_3$-Si$(OH)_2CH_3$, HN$((CH_2)_3$-Si$(OCH_3)_3)_2$, HN$((CH_2)_3$-Si$(OC_2H_5)_3)_2$, HN$((CH_2)_3$-Si$(OCH_3)_2CH_3)_2$, HN$((CH_2)_3$-Si$(OC_2H_5)_2CH_3)_2$, cyclo-$C_6H_{11}NH(CH_2)$-Si$(OCH_3)_3$, cyclo-$C_6H_{11}NH(CH_2)$-Si$(OC_2H_5)_3$, cyclo-$C_6H_{11}NH(CH_2)$-Si$(OCH_3)_2CH_3$, cyclo-$C_6H_{11}NH(CH_2)$-Si$(OC_2H_5)_2CH_3$, cyclo-$C_6H_{11}NH(CH_2)$-Si$(OH)_3$, cyclo-$C_6H_{11}NH(CH_2)$-Si$(OH)_2CH_3$, phenyl-$NH(CH_2)$-Si$(OCH_3)_3$-phenyl-$NH(CH_2)$-Si$(OC_2H_5)_3$-phenyl-$NH(CH_2)$-Si$(OCH_3)_2CH_3$, phenyl-$NH(CH_2)$-Si$(OC_2H_5)_2CH_3$, phenyl-$NH(CH_2)$-Si$(OH)_3$, and phenyl-$NH(CH_2)$-Si$(OH)_2CH_3$, and also their partial hydrolysates, where $H_2N(CH_2)_2NH(CH_2)_3$-Si$(OCH_3)_3$, $H_2N(CH_2)_2NH(CH_2)_3$-Si$(OC_2H_5)_3$, $H_2N(CH_2)_2NH(CH_2)_3$-Si$(OCH_3)_2CH_3$, cyclo-$C_6H_{11}NH(CH_2)_3$-Si$(OCH_3)_3$, cyclo-$C_6H_{11}NH(CH_2)_3$-Si$(OC_2H_5)_3$, and cyclo-$C_6H_{11}NH(CH_2)_3$-Si$(OCH_3)_2CH_3$ and also in each case their partial hydrolysates are preferred, and $H_2N(CH_2)_2NH(CH_2)_3$-Si$(OCH_3)_3$, $H_2N(CH_2)_2NH(CH_2)_3$-Si$(OCH_3)_2CH_3$, cyclo-$C_6H_{11}NH(CH_2)_3$-Si$(OCH_3)_3$, cyclo-$C_6H_{11}NH(CH_2)_3$-Si$(OCH_3)_2CH_3$ and also in each case their partial hydrolysates are particularly preferred.

The organosilicon compounds (D) employed optionally in accordance with the invention may also take on the function of a curing catalyst or curing cocatalyst in the compositions of the invention.

Furthermore, the organosilicon compounds (D) employed optionally in accordance with the invention may act as adhesion promoters and/or as water scavengers.

The organosilicon compounds (D) employed optionally in accordance with the invention are commercial products and/or are preparable according to methods common in chemistry.

If the compositions of the invention do comprise component (D), the amounts are preferably 0.1 to 25 parts by weight, more preferably 0.2 to 20 parts by weight, most preferably 0.5 to 15 parts by weight, based in each case on 100 parts by weight of component (A). The compositions of the invention preferably do comprise component (D).

The fillers (E) employed optionally in the compositions of the invention and differing from component (C) may be any useful fillers.

Examples of fillers (E) are nonreinforcing fillers, these being fillers having a BET surface area of preferably up to 50 m$^2$/g, such as quartz, diatomaceous earth, calcium silicate, zirconium silicate, talc, kaolin, zeolites, metal oxide powders, such as aluminum, titanium, iron or zinc oxides and/or their mixed oxides, barium sulfate, calcium carbonate, gypsum, silicon nitride, silicon carbide, boron nitride, glass powders, and plastics powders, such as polyacrylonitrile powders; reinforcing fillers, these being fillers having a BET surface area of more than 50 m$^2$/g, such as pyrogenically prepared silica, precipitated silica, precipitated chalk, and mixed silicon aluminum oxides of high BET surface area; aluminum trihydroxide, fillers in hollow bead form, such as ceramic microbeads, elastic polymeric beads, glass beads, or fibrous fillers. The fillers stated may have been hydrophobized, by treatment for example with organosilanes and/or organosiloxanes or with stearic acid, or by etherification of hydroxyl groups to alkoxy groups.

The fillers (E) employed optionally are preferably calcium carbonate, magnesium carbonate and/or mixed calcium magnesium carbonates, talc, aluminum trihydroxide, and silica. Preferred calcium carbonate grades are ground or precipitated and optionally surface-treated with fatty acids such as stearic acid or salts thereof. The preferred silica is preferably pyrogenic silica.

Fillers (E) employed optionally have a moisture content of preferably below 1 wt %, more preferably of below 0.5 wt %.

If the compositions of the invention do comprise fillers (E) differing from component (C), the amounts involved are preferably 10 to 1000 parts by weight, more preferably 40 to 500 parts by weight, more particularly 80 to 300 parts by weight, based in each case on 100 parts by weight of constituent (A). The compositions of the invention preferably do comprise fillers (E).

More preferably the composition of the invention comprises calcium carbonate, magnesium carbonate and/or mixed calcium magnesium carbonates as filler (E1) in amounts of 10 to 900 parts by weight, more preferably 40 to 450 parts by weight, and most preferably 80 to 280 parts by weight, based in each case on 100 parts by weight of constituent (A). Besides the fillers (E1), preferably in the amounts stated, there may also be further fillers (E2) present, differing from components (C) and (E1). As fillers (E2) in this case it is possible to use the same materials already described as fillers (E), provided they do not fall within the definition of (E1). The preferred total amounts of fillers (E1) and (E2) correspond in this case to the preferred amounts specified above for fillers (E).

As nonreactive plasticizers (F) employed optionally it is possible to use all nonreactive plasticizers which have also been used to date in crosslinkable organopolysiloxane compositions.

The nonreactive plasticizers (F) are preferably organic compounds selected from the classes of substance consisting of fully esterified aromatic or aliphatic carboxylic acids,
fully esterified derivatives of phosphoric acid,
fully esterified derivatives of sulfonic acids,
branched or unbranched saturated hydrocarbons,
polystyrenes,
polybutadienes,
polyisobutylenes,
polyesters or
polyethers.

The nonreactive plasticizers (F) employed optionally in accordance with the invention are preferably plasticizers which at temperatures <80° C. react neither with water nor with components (A) and (B), are liquid at 20° C. and 1013 hPa, and have a boiling point >250° C. at 1013 hPa.

Examples of carboxylic esters (F) are phthalic esters, such as dioctyl phthalate, diisooctyl phthalate, diisononyl phthalate, diisodecyl phthalte and diundecyl phthalate; perhydrogenated phthalic esters, such as diisononyl 1,2-cyclohexanedicarboxylate and dioctyl 1,2-cyclohexanedicarboxylate; adipic esters, such as dioctyl adipate; benzoic esters; esters of trimellitic acid, glycol esters; esters of saturated alkanediols, such as 2,2,4-trimethyl-1,3-pentanediol monoisobutyrates and 2,2,4-trimethyl-1,3-pentanediol diisobutyrates, for example.

Examples of polyethers (F) are polyethylene glycols, polyTHF, and polypropylene glycols having molar masses of preferably 200 to 20,000 g/mol. Preferred for use are plasticizers (F) having molar masses—or, in the case of polymeric plasticizers, average molar masses $M_n$—of at least 200 g/mol, more preferably of greater than 500 g/mol, most preferably of greater than 900 g/mol. They preferably possess molar masses or, respectively, average molar masses $M_n$ of not more than 20,000 g/mol, more preferably of not more than 10,000 g/mol, and most preferably at most 8000 g/mol.

In one preferred implementation of the invention, component (F) used comprises plasticizers free from phthalic esters, such as perhydrogenated phthalic esters, esters of trimellitic acid, polyesters or polyethers. More preferably, plasticizer (F) comprises polyethers, more particularly polyethylene glycols, polyTHF, and polypropylene glycols, very preferably polypropylene glycols. The preferred polyethers (F) preferably have molar masses of between 400 and 20,000 g/mol, more preferably between 800 and 12,000 g/mol, and most preferably between 1000 and 8000 g/mol.

If the compositions of the invention do comprise nonreactive plasticizers (F), the amounts involved are preferably 5 to 300 parts by weight, more preferably 10 to 200 parts by weight, most preferably 20 to 150 parts by weight, based in each case on 100 parts by weight of component (A). The compositions of the invention preferably do comprise plasticizers (F).

The catalysts (G) employed optionally in the compositions of the invention may be any desired catalysts known to date for compositions that cure by silane condensation.

Examples of metal-containing curing catalysts (G) are organotitanium and organotin compounds, as for example titanic esters, such as tetrabutyl titanate, tetrapropyl titanate, tetraisopropyl titanate, and titanium tetraacetylacetonate; tin compounds, such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (G) are basic compounds, such as triethylamine, tributylamine, 1,4-diazabicyclo[2.2.2]octane, 1,5-diazabicyclo[4.3.0]non-5-ene, 1,8-diazabicyclo[5.4.0]undec-7-ene, N,N-bis(N,N-dimethyl-2-aminoethyl)methylamine, N,N-dimethylcyclohexylamine, N,N-dimethylphenylamine, and N-ethylmorpholinine.

As catalyst (G) it is likewise possible to employ acidic compounds, such as phosphoric acid and its partially esterified derivatives, toluenesulfonic acid, sulfuric acid, nitric acid, or else organic carboxylic acids, e.g., acetic acid and benzoic acid.

If the compositions of the invention do comprise catalysts (G), the amounts are preferably 0.01 to 20 parts by weight, more preferably 0.05 to 5 parts by weight, based in each case on 100 parts by weight of constituent (A).

In one implementation of the invention, the catalysts (G) employed optionally are metal-containing curing catalysts, preferably tin-containing catalysts. This embodiment of the invention is especially preferred when component (A) consists wholly or at least partly, i.e., to an extent of at least 90 wt %, preferably at least 95 wt %, of compounds of the formula (I) in which b is not 1.

In the compositions of the invention it is possible with preference to do without metal-containing catalysts (G), and more particularly tin-containing catalysts, when component (A) consists wholly or at least partly, i.e., to an extent of at least 10 wt %, preferably at least 20 wt %, of compounds of the formula (I) in which b is 1 and $R^1$ is hydrogen. This embodiment of the invention without metal-containing catalysts and more particularly without tin-containing catalysts is particularly preferred.

The adhesion promoters (H) employed optionally in the compositions of the invention may be any desired adhesion promoters described to date for systems that cure by silane condensation.

Examples of adhesion promoters (H) are epoxysilanes such as glycidyloxypropyltrimethoxysilanes, glycidyloxypropylmethyl-dimethoxysilane, glycidyloxypropyltriethoxysilane or glycidyloxypropylmethyldiethoxysilane, 2-(3-triethoxysilylpropyl)maleic anhydride, N-(3-trimethoxysilylpropyl)urea, N-(3-triethoxysilylpropyl)urea, N-(trimethoxysilylmethyl)urea, N-(methyldimethoxysilylmethyl)urea, N-(3-triethoxysilylmethyl)urea, N-(3-methyldiethoxysilylmethyl) urea, O-methylcarbamatomethylmethyl-dimethoxysilane, O-methylcarbamatomethyltrimethoxysilane, O-ethylcarbamatomethylmethyldiethoxysilane, O-ethyl-carbamatomethyltriethoxysilane, 3-methacryloyloxypropyl-trimethoxysilane, methacryloyloxymethyltrimethoxysilane, methacryloyloxymethylmethyldimethoxysilane, methacryloyloxy-methyltriethoxysilane, methacryloyloxymethylmethyldiethoxy-silane, 3-acryloxypropyltrimethoxysilane, acryloxymethyl-trimethoxysilane, acryloxymethylmethyldimethoxysilanes, acryloxymethyltriethoxysilane, and acryloxymethylmethyl-diethoxysilane, and also their partial condensates.

If the compositions of the invention do comprise adhesion promoters (H), the amounts are preferably 0.5 to 30 parts by weight, more preferably 1 to 10 parts by weight, based in each case on 100 parts by weight of crosslinkable composition.

The water scavengers (I) employed optionally in the compositions of the invention may be any desired water scavengers described for systems that cure by silane condensation.

Examples of water scavengers (I) are silanes such as vinyltrimethoxysilane, vinyltriethoxysilane, vinylmethyldimethoxysilane, tetraethoxysilane, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, and/or their partial condensates, and also orthoesters, such as 1,1,1-trimethoxyethane, 1,1,1-triethoxyethane, trimethoxymethane, and triethoxymethane, with preference being given to vinyltrimethoxysilane.

If the compositions of the invention do comprise water scavengers (I), the amounts are preferably 0.5 to 30 parts by weight, more preferably 1 to 10 parts by weight, based in each case on 100 parts by weight of crosslinkable composition. The compositions of the invention preferably do comprise water scavengers (I).

The additives (J) employed optionally in the compositions of the invention may be any desired additives known to date and typical of silane-crosslinking systems.

The additives (J) employed optionally in accordance with the invention are compounds differing from the components identified so far, and preferably are antioxidants, UV stabilizers such as HALS compounds, for example, fungicides, commercial defoamers such as those from BYK (Wesel, DE), for example, commercial wetting agents such as those from BYK (Wesel, DE), for example, and pigments.

If the compositions of the invention do comprise additives (J), the amounts are preferably 0.01 to 30 parts by weight, more preferably 0.1 to 10 parts by weight, based in each case on 100 parts by weight of constituent (A). The compositions of the invention preferably do comprise additives (J).

The adjuvants (K) employed optionally in accordance with the invention are preferably tetraalkoxysilanes, such as tetraethoxysilane, for example, and/or partial condensates thereof, reactive plasticizers, rheological additives, flame retardants or organic solvents.

Preferred reactive plasticizers (K) are compounds which comprise alkyl chains having 6 to 40 carbon atoms and which possess a group that is reactive toward the compounds (A). Examples are isooctyltrimethoxysilane, isooctyltriethoxysilane, N-octyltrimethoxysilane, N-octyltriethoxysilane, decyltrimethoxysilane, decyltriethoxysilane, dodecyltrimethoxysilane, dodecyltriethoxysilane, tetradecyltrimethoxysilane, tetradecyltriethoxysilane, hexadecyltrimethoxysilane, and hexadecyltriethoxysilane.

The rheological additives (K) are preferably room-temperature-solid polyamide waxes, hydrogenated castor oils or stearates.

As flame retardants (K) it is possible to use all typical flame retardants of the kind typical of adhesive and sealant systems, more particularly halogenated compounds and derivatives, especially (partial) esters, of phosphoric acid.

Examples of organic solvents (K) are the compounds already identified above as solvents (BL), preferably alcohols.

With preference no organic solvents (K) are added to the compositions of the invention.

If the compositions of the invention do comprise one or more components (K), the amounts in each case are preferably 0.5 to 200 parts by weight, more preferably 1 to 100 parts by weight, more particularly 2 to 70 parts by weight, based in each case on 100 parts by weight of component (A).

The compositions of the invention are preferably those comprising
- (A) 100 parts by weight of compounds of the formula (I),
- (B) 5-300 parts by weight of silicone resins comprising units of the formula (II), preferably resins (B1),
- (C) 10-200 parts by weight of carbon black,
- (D) 0.1-25 parts by weight of organosilicon compounds comprising units of the formula (III),
- (E) 10-1000 parts by weight of fillers,
- optionally (F) plasticizers,
- optionally (G) catalysts,
- optionally (H) adhesion promoters,
- optionally (I) water scavengers,
- optionally (J) additives, and
- optionally (K) adjuvants.

More preferably the compositions of the invention are those comprising
- (A) 100 parts by weight of compounds of the formula (I),
- (B) 10-200 parts by weight of silicone resins comprising units of the formula (II), preferably resins (B1),
- (C) 20-200 parts of carbon black,
- (D) 0.1-25 parts by weight of organosilicon compounds comprising units of the formula (III),
- (E1) 10-900 parts by weight of calcium carbonate, magnesium carbonate and/or mixed calcium magnesium carbonates,
- optionally (E2) fillers differing from components (C) and (E1),
- optionally (F) plasticizers,
- optionally (G) catalysts,
- optionally (H) adhesion promoters,
- optionally (I) water scavengers,
- optionally (J) additives, and
- optionally (K) adjuvants.

Yet more preferably the compositions of the invention are those comprising
- (A) 100 parts by weight of compounds of the formula (I) where Y is an x-valent polymer radical which is bonded via nitrogen, oxygen, sulfur or carbon and which comprises polyurethanes or polyoxyalkylenes as its polymer chain,
- (B) 10-200 parts by weight of silicone resins comprising units of the formula (II), preferably resins (B1),
- (C) 20-200 parts of carbon black,
- (D) 0.1-25 parts by weight of organosilicon compounds comprising units of the formula (III),
- (E1) 10-450 parts by weight of calcium carbonate, magnesium carbonate and/or mixed calcium magnesium carbonates,
- (F) 10-200 parts by weight of plasticizers,
- optionally (E2) fillers differing from components (C) and (E1),
- optionally (G) catalysts,
- optionally (H) adhesion promoters,
- optionally (I) water scavengers,
- optionally (J) additives, and
- optionally (K) adjuvants.

In the case of a further particularly preferred embodiment, the compositions of the invention are those comprising
- (A) 100 parts by weight of compounds of the formula (I) where Y is an x-valent polymer radical which is bonded via nitrogen, oxygen, sulfur or carbon and which comprises polyurethanes or polyoxyalkylenes as its polymer chain, (B) 10-200 parts by weight of silicone resins comprising units of the formula (II) in which $R^5$ is a phenyl radical, and which, based in each case on the total number of units of the formula (II), have at least 70% of units of the formula (II) in which e has a value of 1,
(C) 20-200 parts by weight of furnace black,
(D) 0.1-25 parts by weight of silanes of the formula (III),
(E1) 10-900 parts by weight of calcium carbonate, magnesium carbonate and/or mixed calcium magnesium carbonates,
optionally (E2) fillers differing from components (C) and (E1),
optionally (F) plasticizers,
optionally (G) catalysts,
optionally (H) adhesion promoters,
optionally (I) water scavengers,
optionally (J) additives, and
optionally (K) adjuvants.

The components used in accordance with the invention may each comprise one kind of such a component or else a mixture of at least two kinds of a respective component.

The compositions of the invention preferably comprise no components beyond components (A) to (K).

The compositions of the invention are preferably viscous to pasty compositions preferably having viscosities of 500 to 3,000,000 mPas, more preferably of 1500 to 1,500,000 mPas, in each case at 25° C.

The compositions of the invention can be produced by any desired means known per se, such as, for instance, according to techniques and mixing methods of the kind customary for the production of moisture-curing compositions. The sequence in which the various constituents are mixed with one another may be varied as desired.

A further subject of the present invention is a method for producing the compositions of the invention by mixing the individual components in any order.

This mixing may take place at room temperature and under the pressure of the surrounding atmosphere, in other words about 900 to 1100 hPa. If desired, however, this mixing may also take place at higher temperatures, as for example at temperatures in the range from 30 to 130° C. It is possible, moreover, temporarily or continuously, to carry out mixing under reduced pressure, such as at 30 to 500 hPa absolute pressure, for example, in order to remove volatile compounds and/or air.

The mixing according to the invention takes place preferably in the absence of moisture.

The method of the invention may be carried out continuously or batchwise.

The compositions of the invention are preferably one-component crosslinkable compositions. The compositions of the invention may alternatively be part of two-component crosslinking systems in which case OH-containing compounds, such as water, are added in a second component.

The compositions of the invention are storable in the absence of water and crosslinkable on ingress of water.

The customary water content of the air is sufficient for the crosslinking of the compositions of the invention. The compositions of the invention are crosslinked preferably at room temperature. The crosslinking may if desired also be carried out at temperatures higher or lower than room temperature, as for example at −5° C. to 15° C. or at 30° C. to 50° C., and/or by means of concentrations of water that exceed the normal water content of the air.

The crosslinking is carried out preferably under a pressure of 100 to 1100 hPa, more particularly under the pressure of the surrounding atmosphere, in other words about 900 to 1100 hPa.

A further subject of the present invention are shaped articles produced by crosslinking the compositions of the invention.

The shaped articles of the invention preferably have a tensile strength of at least 4.0 MPa, more preferably of at least 4.5 MPa, and most of at least 5 MPa, measured in each case according to DIN EN 53504-S1.

The shaped articles of the invention preferably have an elongation at break of at least 300%, more preferably of at least 350%, and most preferably of at least 400%, measured in each case according to DIN EN 53504-S1.

The shaped articles of the invention preferably possess a tear resistance of at least 20 N/mm, more preferably of at least 25 N/mm, measured in each case according to ASTM D 624 B.

The shaped articles of the invention may comprise any desired shaped articles, such as, for instance, seals, compression-molded articles, extruded profiles, coatings, impregnated systems, castings, lenses, prisms, polygonal structures, laminate layers or adhesive layers.

A further subject of the invention is a method for producing assemblies of materials, wherein the composition of the invention is applied to at least one substrate and is subsequently caused to crosslink.

Examples of this are coatings, castings, the production of molded articles, composite materials, and composite moldings. Composite moldings here refer to a unitary molded article made from a composite material with a composition, comprising a crosslinking product of the compositions of the invention and at least one substrate, such that there is a strong, permanent connection between the two parts.

In the case of the method of the invention for producing assemblies of materials, the composition of the invention may also be vulcanized between at least two identical or different substrates, as in the case of adhesive bonds, laminates or encapsulated systems, for example.

Examples of substrates which can be bonded or sealed in accordance with the invention are plastics, including PVC, metals, concrete, wood, mineral substrates, glass, ceramic, and coated surfaces.

The compositions of the invention can be used for all end uses for which it is possible to employ compositions that are storable in the absence of water but on ingress with water crosslink at room temperature to form elastomers.

The compositions of the invention are therefore outstandingly suitable, for example, for the sealing and flexible bonding of metallic components. The compositions of the invention can be used accordingly as assembly adhesives, for automotive engineering and for production of bus, truck, and rail vehicles. Furthermore, they are suitable for window construction, particularly for roof windows, for structural glazing bonds, or for the production of photovoltaic elements, glass display systems, and also, for example, for production of protective coatings or of moldings, and also for the insulation of electrical or electronic devices.

The compositions of the invention have the advantage that they are easy to produce.

The crosslinkable compositions of the invention have the advantage of a very high storage stability and a high crosslinking rate.

Furthermore, the crosslinkable compositions of the invention have the advantage that they exhibit an excellent adhesion profile.

The crosslinkable compositions of the invention, moreover, have the advantage that they are easy to process.

Unless otherwise stated, all working steps in the examples below are carried out under the pressure of the surrounding atmosphere, in other words approximately at 1013 hPa, and at room temperature, in other words at approximately 23° C., or at a temperature which comes about when the reactants are combined at room temperature without additional heating or cooling. The compositions are crosslinked at a relative atmospheric humidity of approximately 50%. Furthermore, all figures for parts and percentages, unless otherwise stated, are by weight.

EXAMPLES

Polymer 1: Silane-terminated polypropylene glycol having an average molar mass ($M_e$) of 18,000 g/mol and end groups of the formula —O—C(=O)—NH—$(CH_2)_3$-Si$(OCH_3)_3$ (available commercially under the name GENIOSIL® STP-E35 from Wacker Chemie AG, Munich, DE);

Carbon black 1: carbon black having a BET surface area of around 105 $m^2$/g, an average particle size of around 25 nm, and an oil number of around 49 ml/100 g (available commercially under the name Printex® 55 from Orion, Frankfurt am Main, DE);

Carbon black 2: carbon black having a BET surface area of around 120 $m^2$/g, an average particle size of around 21 nm and an oil number of around 118 ml/100 g (available commercially under the name Printex® 60 from Orion, Frankfurt am Main, DE).

Preparation of Phenylsilicone Resin

A 2 l four-neck flask with dropping funnel, Liebig condenser, KPG stirrer, and thermometer is charged at room temperature with 1000 g of phenyltrimethoxysilane and admixed, while stirring, with 20 g of 20% strength aqueous hydrochloric acid. This initial charge is subsequently heated to a temperature of 65-68° C. until the onset of a gentle reflux. Then, under reflux, a mixture of 74 g of water and 40 g of methanol is added at a uniform rate over the course of 30 minutes. After the end of the addition, stirring is continued under reflux for 10 minutes more, after which the mixture is cooled to room temperature.

The reaction mixture is left to stand at room temperature for around 16 hours, then 60 g of sodium hydrogencarbonate are added with stirring, and stirring is continued for 30 minutes, after which the resulting solid is removed by filtration. Lastly the low boilers (essentially methanol) are removed by distillation. In this procedure, initially around 80-90% of the quantity of distillate to be removed is removed at 1013 mbar and a temperature of 120° C., and then the pressure is reduced to 10 mbar and the remaining low-boiling residuals are removed by distillation over the following 15-20 minutes.

The product is a phenylsilicone resin having an average molar mass Mn of 1200 g/mol, a viscosity of 90 mPas at 23° C. and a methoxy group content of 18%, based on the overall resin mass.

Inventive Example 1

143.6 g of polymer 1 are homogenized in a laboratory planetary mixer from PC-Laborsysteme, equipped with two bar mixers, at about 25° C. with 50.4 g of the above-prepared phenylsilicone resin, 72.4 g of diisodecyl phthalate as plasticizer, and 4.8 g of vinyltrimethoxysilane at 200 rpm for 2 minutes. Then 60.8 g of a chalk having a BET surface area of 15 $m^2$/g and a d50 of 0.45 μm (available commercially under the name "Socal U1S2" from Solvay) and 62.8 g of carbon black 1 are incorporated with stirring at 600 rpm for one minute. Following the incorporation of carbon black and chalk, 4.8 g of N-(2-aminoethyl)aminopropyltrimethoxysilane and 0.4 g of dioctyltin dilaurate are mixed in at 200 rpm for 1 minute. Finally, under the pressure of around 100 mbar, the mixture is homogenized and stirred until free of bubbles, at 600 rpm for 2 minutes and at 200 rpm for 1 minute.

The resulting composition is dispensed into 310 ml PE cartridges, provided with airtight closures, and stored at 20° C. over 24 hours prior to analysis.

Comparative Example 1 (C1)

The procedure followed is as for inventive example 1 but using 194 g of polymer 1 instead of 143.6 g of polymer 1 and 50.4 g of phenylsilicone resin.

Inventive Example 2

The procedure followed is as for example 1 but using 62.8 g of carbon black 2 instead of the same amount of carbon black 1.

Comparative Example 2 (C2)

The procedure followed is as for inventive example 2 but using 194 g of polymer 1 instead of 143.6 g of polymer 1 and 50.4 g of phenylsilicone resin.

Inventive Example 3

The compositions obtained in inventive examples 1 and 2 and in comparative examples 1 and 2 (C1 and C2) are allowed to crosslink and are analyzed for their skin formation and their mechanical properties. The results are given in Table 1.

Skin Formation Time (SFT)

For determination of the skin formation time, the crosslinkable compositions obtained in the examples are applied in a layer 2 mm thick to PE film and stored under standard conditions (23° C. and 50% relative humidity). In the course of the curing process, the formation of a skin is tested every 5 minutes. This is done by carefully placing a dry laboratory spatula on to the surface of the sample and pulling it in an upward direction. If the sample sticks to the spatula, a skin is yet to form. If the sample no longer sticks to the spatula, a skin has formed and the time is recorded.

Mechanical Properties

The compositions were each coated out onto milled Teflon plates to a depth of 2 mm and cured at 23° C., relative humidity 50, for 2 weeks.

The Shore A hardness is determined according to DIN EN 53505. The tensile strength is determined according to DIN EN 53504-S1.

The elongation at break is determined according to DIN EN 53504-S1.

The 100% modulus is determined according to DIN EN 53504-S1. The tear resistance is determined according to ASTM D 624 B.

TABLE 1

|  | Composition from example | | | |
|---|---|---|---|---|
|  | 1 | C1 | 2 | C2 |
| Carbon black [wt %] | 15.7 | 15.7 | 15.7 | 15.7 |
| Phenylsilicone resin [wt %] | 12.6 | 0.0 | 12.6 | 0.0 |
| SFT [min] | 150 | 22 | 55 | 11 |
| Shore A hardness | 57 | 52 | 66 | 57 |
| Tensile strength [N/mm$^2$] | 4.6 | 3.0 | 6.8 | 4.8 |
| Elongation at break [%] | 362 | 213 | 406 | 238 |
| 100% modulus [MPa] | 1.9 | 1.4 | 2.6 | 2.1 |
| Tear resistance [N/mm] | 26.6 | 13.0 | 29.4 | 17.9 |

Inventive Example 4

103.6 g of polymer 1 are homogenized in a laboratory planetary mixer from PC-Laborsysteme, equipped with two bar mixers, at about 25° C. with 36.4 g of the above-prepared phenylsilicone resin, 59.2 g of a polypropylene glycol having an average molar mass $M_n$ of 2000 g/mol, 8.0 g of vinyltrimethoxysilane, and 2.0 g of a stabilizer mixture (mixture, available commercially under the name TINUVIN® B 75 from BASF AG (Germany), composed of 20% Irganox® 1135 (CAS No. 125643-61-0), 40% Tinuvin® 571 (CAS No. 23328-53-2) and 40% Tinuvin® 765 (CAS No. 41556-26-7)) at 200 rpm for 2 minutes. Then 120.0 g of a precipitated chalk coated with fatty acid and having an average particle diameter (D50%) of around 0.77 pm (available commercially under the name Hakuenka® CCR S10 from Shiraishi Omya GmbH, Gummern, AT) and 66.0 g of carbon black 1 are incorporated with stirring at 600 rpm for one minute. Following the incorporation of carbon black and chalk, 4.0 g of N-(2-aminoethyl)aminopropyl-trimethoxysilane and 0.8 g of dioctyltin dilaurate are mixed in at 200 rpm for 1 minute. Finally, under the pressure of around 100 mbar, the mixture is homogenized and stirred until free of bubbles, at 600 rpm for 2 minutes and at 200 rpm for 1 minute.

The resulting composition is dispensed into 310 ml PE cartridges, provided with airtight closures, and stored at 20° C. over 24 hours prior to analysis.

Inventive Example 5

The procedure followed is as for inventive example 4 but using 66.0 g carbon black 2 instead of the same amount of carbon black 1.

Inventive Example 6

81.8 g of polymer 1 are homogenized in a laboratory planetary mixer from PC-Laborsysteme, equipped with two bar mixers, at about 25° C. with 18.2 g of the above-prepared phenylsilicone resin, 99.2 g of a polypropylene glycol having an average molar mass $M_n$ of 2000 g/mol, 8.0 g of vinyltrimethoxysilane, and 2.0 g of a stabilizer mixture (mixture, available commercially under the name TINUVIN® B 75 from BASF AG (Germany), composed of 20% Irganox® 1135 (CAS No. 125643-61-0), 40% Tinuvin® 571 (CAS No. 23328-53-2) and 40% Tinuvin® 765 (CAS No. 41556-26-7)) at 200 rpm for 2 minutes. Then 120.0 g of a precipitated chalk coated with fatty acid and having an average particle diameter (D50%) of around 0.77 pm (available commercially under the name Hakuenka® CCR S10 from Shiraishi Omya GmbH, Gummern, AT) and 66.0 g of carbon black 1 are incorporated with stirring at 600 rpm for one minute. Following the incorporation of carbon black and chalk, 4.0 g of N-(2-aminoethyl)aminopropyl-trimethoxysilane and 0.8 g of dioctyltin dilaurate are mixed in at 200 rpm for 1 minute. Finally, under the pressure of around 100 mbar, the mixture is homogenized and stirred until free of bubbles, at 600 rpm for 2 minutes and at 200 rpm for 1 minute.

The resulting composition is dispensed into 310 ml PE cartridges, provided with airtight closures, and stored at 20° C. over 24 hours prior to analysis.

Inventive Example 7

The procedure followed is as for inventive example 6 but using 66.0 g carbon black 2 instead of the same amount of carbon black 1.

Inventive Example 8

The compositions obtained in inventive examples 4 to 7 are allowed to crosslink and are analyzed for their skin formation and their mechanical properties in accordance with the methods specified in example 3. The results are given in Table 2.

TABLE 2

|  | Composition from example | | | |
|---|---|---|---|---|
|  | 4 | 5 | 6 | 7 |
| SFT [min] | 58 | 25 | 106 | 62 |
| Shore A hardness | 67 | 74 | 54 | 62 |
| Elongation at break [%] | 502 | 285 | 549 | 434 |
| Tensile strength [N/mm$^2$] | 5.9 | 5.6 | 4.3 | 4.9 |
| 100% modulus [MPa] | 2.4 | 3.5 | 1.3 | 2.1 |
| Tear resistance [N/mm] | 42.9 | 28.5 | 31.2 | 36.5 |

The invention claimed is:
1. A crosslinkable composition, comprising:
(A) 100 parts by weight of one or more compounds of the formula

$$Y\text{---}[(CR^1{}_2)_b\text{-}SiR_a(OR^2)_{3-a}]_x \qquad (I),$$

where
Y denotes an x-valent polymer radical bonded to a carbon of the $(CR^1{}_2)_b$ group via nitrogen, oxygen, sulfur or carbon,
R are identical or different and represent monovalent, optionally substituted hydrocarbyl radicals,
$R^1$ are identical or different and represent hydrogen or monovalent, optionally substituted hydrocarbyl radicals which are optionally attached to the carbon atom of $(CR^1)_b$ via nitrogen, phosphorus, oxygen, sulfur or a carbonyl group,
$R^2$ are identical or different and represent hydrogen or a monovalent, optionally substituted hydrocarbyl radical,
x is an integer from 1 to 10,
a is identical or different and is 0, 1 or 2, and
b is identical or different and is an integer from 1 to 10,
(B) at least 5 parts by weight of at least one silicone resin comprising units of the formula $$R^3{}_c(R^4O)_d R^5{}_e SiO_{(4-c-d-e)/2} \qquad (II),$$

where
$R^3$ are identical or different and denote hydrogen, a monovalent, SiC-bonded, optionally substituted aliphatic hydrocarbyl radical or a divalent, optionally substituted, aliphatic hydrocarbyl radical which bridges two units of the formula (II),
$R^4$ are identical or different and represent hydrogen or a monovalent, optionally substituted hydrocarbyl radical, $R^5$ are identical or different and represents a monovalent, SiC-bonded, optionally substituted aromatic hydrocarbyl radical,
c is 0, 1, 2 or 3,
d is 0, 1, 2 or 3, and
e is 0, 1 or 2,
with the proviso that the sum of c+d+e is less than or equal to 3 and in at least 40% of the units of the formula (II) the sum c+e is 0 or 1, and
(C) at least 10 parts by weight of carbon black.

2. The crosslinkable composition of claim 1, comprising:
(A) 100 parts by weight of compounds of the formula $$Y-[(CR^1{}_2)_b\text{-}SiR_a(OR^2)_{3-a}]_x \qquad (I),$$

where
Y denotes an x-valent polymer radical bonded via nitrogen, oxygen, sulfur or carbon and comprising polyurethanes or polyoxyalkylenes as its polymer chain,
R are identical or different and represent a monovalent, optionally substituted hydrocarbyl radical,
$R^1$ are identical or different and represent hydrogen or a monovalent, optionally substituted hydrocarbyl radical optionally attached to carbon via nitrogen, phosphorus, oxygen, sulfur or a carbonyl group,
$R^2$ are identical or different and represent hydrogen atom or a monovalent, optionally substituted hydrocarbyl radical,
x is an integer from 1 to 10,
a is identical or different and is 0, 1 or 2, and
b is identical or different and is an integer from 1 to 10,
(B) at least 5 parts by weight of silicone resin(s) comprising units of the formula $$R^3{}_c(R^4O)_d R^5{}_e SiO_{(4-c-d-e)/2} \qquad (II),$$

where
$R^3$ are identical or different and denote hydrogen, a monovalent, SiC-bonded, optionally substituted aliphatic hydrocarbyl radical or a divalent, optionally substituted, aliphatic hydrocarbyl radical which bridges two units of the formula (II),
$R^4$ are identical or different and represent hydrogen or a monovalent, optionally substituted hydrocarbyl radical,
$R^5$ are identical or different and represent a monovalent, SiC-bonded, optionally substituted aromatic hydrocarbyl radical,
c is 0, 1, 2 or 3,
d is 0, 1, 2 or 3, and
e is 0, 1 or 2,
with the proviso that the sum of c+d+e is less than or equal to 3 and in at least 40% of the units of the formula (II) the sum c+e is 0 or 1, and
(C) at least 10 parts by weight of carbon black.

3. The crosslinkable composition of claim 2, wherein component (B) comprises silicone resins (B1) which, based on the total number of units of the formula (II), have at least 30% of units of the formula (II) in which the value of e is 1 and the value of c is 0.

4. The crosslinkable composition of claim 2, wherein component (C) comprises furnace blacks.

5. The crosslinkable composition of claim 2, wherein component (C) comprises furnace blacks having a BET surface area of 30 to 600 $m^2/g$ and an oil number of between 40 and 180 ml/100 g.

6. A method for producing a composition of claim 2, comprising mixing the individual components in any order.

7. A shaped article produced by crosslinking a composition of claim 2.

8. A method for producing an assembly of materials, comprising applying a composition of claim 2 to at least one substrate, and subsequently crosslinking the composition.

9. The crosslinkable composition of claim 1, wherein component (B) comprises silicone resins (B1) which, based on the total number of units of the formula (II), have at least 30% of units of the formula (II) in which the value of e is 1 and the value of c is 0.

10. The crosslinkable composition of claim 1, wherein component (C) comprises furnace blacks.

11. The crosslinkable composition of claim 1, wherein component (C) comprises furnace blacks having a BET surface area of 30 to 600 $m^2/g$ and an oil number of between 40 and 180 ml/100 g.

12. The crosslinkable composition of claim 1, comprising:
(A) 100 parts by weight of compound(s) of the formula (I),
(B) 5-300 parts by weight of silicone resin(s) comprising units of the formula (II),
(C) 10-200 parts by weight of carbon black,
(D) 0.1-25 parts by weight of organosilicon compound(s) comprising units of the formula $$D_h Si(OR^7)_g R^6{}_f O_{(4-f-g-h)/2} \qquad (III),$$

in which
$R^6$ are identical or different and denote a monovalent, optionally substituted, SiC-bonded, nitrogen-free organic radical,
$R^7$ are identical or different and denote hydrogen or an optionally substituted hydrocarbyl radical,
D are identical or different and denote a monovalent, SiC bonded radical having at least one nitrogen atom not bonded to a carbonyl group (C=O)
f is 0, 1, 2 or 3,
g is 0, 1, 2 or 3, and
h is 0, 1, 2, 3 or 4,
with the proviso that the sum of f+g+h is less than or equal to 4 and there is at least one radical D present per molecule,
(E) 10-1000 parts by weight of fillers,
optionally (F) plasticizers,
optionally (G) catalysts,
optionally (H) adhesion promoters,
optionally (I) water scavengers,
optionally (J) additives, and
optionally (K) adjuvants.

13. A method for producing a composition of claim 12, comprising mixing the individual components in any order.

14. A shaped article produced by crosslinking a composition of claim 12.

15. A method for producing an assembly of materials, comprising applying a composition of claim 12 to at least one substrate, and subsequently crosslinking the composition.

16. The crosslinkable composition of claim 12, comprising:
(A) 100 parts by weight of compounds of the formula (I) where Y is an x-valent polymer radical which is bonded via nitrogen, oxygen, sulfur or carbon and which comprises polyurethanes or polyoxyalkylenes as its polymer chain,
(B) 10-200 parts by weight of silicone resins comprising units of the formula (II) in which $R^5$ is a phenyl radical, and which, based in each case on the total number of units of the formula (II), have at least 70% of units of the formula (II) in which e has a value of 1,
(C) 20-200 parts by weight of furnace black,
(D) 0.1-25 parts by weight of silanes of the formula (III), (E1) 10-900 parts by weight of calcium carbonate, magnesium carbonate and/or mixed calcium magnesium carbonates,
optionally (E2) fillers differing from components (C) and (E1),
optionally (F) plasticizers,
optionally (G) catalysts,
optionally (H) adhesion promoters,
optionally (I) water scavengers,
optionally (J) additives, and
optionally (K) adjuvants.

17. A method for producing a composition of claim 1, comprising mixing the individual components in any order.

18. A shaped article produced by crosslinking a composition of claim 1.

19. A method for producing an assembly of materials, comprising applying a composition of claim 1 to at least one substrate, and subsequently crosslinking the composition.

* * * * *